(12) United States Patent
Mugundan et al.

(10) Patent No.: US 8,341,154 B2
(45) Date of Patent: Dec. 25, 2012

(54) EXTENDING TYPES HOSTED IN DATABASE TO OTHER PLATFORMS

(75) Inventors: Balendran Mugundan, Redmond, WA (US); Peter Gvozdjak, Sammamish, WA (US); Chadwin J. Mumford, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 347 days.

(21) Appl. No.: 12/607,123

(22) Filed: Oct. 28, 2009

(65) Prior Publication Data

US 2011/0099166 A1   Apr. 28, 2011

(51) Int. Cl.
*G06F 17/30* (2006.01)
(52) U.S. Cl. .................. 707/736; 707/756; 707/701
(58) Field of Classification Search .................. 707/736, 707/756, 701
See application file for complete search history.

(56) References Cited

U.S. PATENT DOCUMENTS

| | | | |
|---|---|---|---|
| 5,893,108 A * | 4/1999 | Srinivasan et al. ..................... 1/1 |
| 6,134,559 A * | 10/2000 | Brumme et al. ...................... 1/1 |
| 6,708,186 B1 * | 3/2004 | Claborn et al. ................ 707/754 |
| 6,901,428 B1 * | 5/2005 | Frazier et al. ................. 709/203 |
| 7,065,771 B1 * | 6/2006 | Prabhu et al. ................. 719/330 |
| 7,325,007 B2 | 1/2008 | Castro et al. |
| 7,480,670 B1 * | 1/2009 | Milby .................................. 1/1 |
| 7,539,688 B2 | 5/2009 | Sezgin et al. |
| 7,720,931 B2 * | 5/2010 | Mei et al. ....................... 709/217 |
| 2002/0099687 A1 * | 7/2002 | Krishnaprasad et al. ......... 707/1 |
| 2003/0195987 A1 * | 10/2003 | Krishnamurthy et al. .... 709/246 |
| 2004/0039748 A1 * | 2/2004 | Jordan et al. .................. 707/101 |
| 2004/0177160 A1 * | 9/2004 | Seto et al. ...................... 709/246 |
| 2004/0199905 A1 * | 10/2004 | Fagin et al. .................... 717/136 |
| 2004/0216086 A1 * | 10/2004 | Bau ................................. 717/114 |
| 2005/0005260 A1 * | 1/2005 | Antonov et al. ............... 717/107 |
| 2005/0033725 A1 * | 2/2005 | Potter et al. ........................ 707/1 |
| 2005/0177581 A1 * | 8/2005 | Sezgin et al. .................. 707/100 |
| 2005/0177589 A1 * | 8/2005 | Venkatesh et al. ............ 707/102 |
| 2005/0257125 A1 * | 11/2005 | Roesner et al. ................ 715/500 |
| 2006/0101423 A1 * | 5/2006 | Aharoni et al. ................ 717/136 |
| 2006/0161962 A1 * | 7/2006 | Hindle et al. .................. 725/115 |
| 2006/0190469 A1 * | 8/2006 | Kathuria et al. ............... 707/101 |
| 2006/0200486 A1 * | 9/2006 | Castro et al. ................... 707/102 |
| 2006/0215448 A1 * | 9/2006 | Ellis et al. .................. 365/185.01 |
| 2006/0271341 A1 * | 11/2006 | Brown et al. ....................... 703/1 |
| 2007/0073784 A1 * | 3/2007 | McVeigh et al. .............. 707/200 |

(Continued)

OTHER PUBLICATIONS

Oracle document, "Oracle User-Defined Types (UDTs) and .NET Custom Types", In Oracle Data Provider for .NET Developer's Guide 11g Release 1 (11.1.0.6.20), copyright 2007, 18 pages, accessed online at <http://docs.oracle.com/html/E10927_01/featUDTs.htm> on Sep. 5, 2012.*

(Continued)

*Primary Examiner* — Phuong Thao Cao
(74) *Attorney, Agent, or Firm* — Microsoft Corporation (57) ABSTRACT

Aspects of the subject matter described herein relate to extending types hosted in a database to other platforms. In aspects, a database may store objects according to a one type system while an application accessing the database may store objects according to another type system. To allow the application to understand the types, a mapping mechanism may be employed that maps from the types of type system of the database to types of a type system of the application. The mapping mechanism may utilize metadata associated with the data in mapping between types. In conjunction with mapping a source type to a target type, a target object may be instantiated and populated with properties of a source object of the source type.

17 Claims, 5 Drawing Sheets

U.S. PATENT DOCUMENTS

| | | | | |
|---|---|---|---|---|
| 2007/0112714 | A1* | 5/2007 | Fairweather | 706/46 |
| 2008/0098373 | A1* | 4/2008 | Vishwanath et al. | 717/143 |
| 2008/0178166 | A1* | 7/2008 | Hunter et al. | 717/165 |
| 2008/0215528 | A1* | 9/2008 | Sedlar | 707/1 |
| 2008/0250045 | A1* | 10/2008 | Balassanian et al. | 707/101 |
| 2009/0031291 | A1* | 1/2009 | Adams | 717/137 |
| 2009/0106273 | A1* | 4/2009 | Petri | 707/100 |
| 2009/0235185 | A1* | 9/2009 | Gill | 715/760 |
| 2010/0094838 | A1* | 4/2010 | Kozak | 707/705 |
| 2010/0299327 | A1* | 11/2010 | Kiefer et al. | 707/736 |

OTHER PUBLICATIONS

Oracle document, "Mapping SQL and Java Types", copyright 1999, 24 pages, accessed online at <http://docs.oracle.com/javase/1.5.0/docs/guide/jdbc/getstart/mapping.html> on Sep. 5, 2012.*

IBM, "Creating UDT-to-Java Mappings", in J/Foundation Developer's Guide, last updated May 2008, 2 pages, accessed online at <http://publib.boulder.ibm.com/infocenter/idshelp/v115/index.jsp?topic=%2Fcom.ibm.jfoun.doc%2Fsii-04udr-34875.htm> on Sep. 5, 2012.*

Peter Henry's TechTidBits (Blog), "Mapping between .NET CLR Types and SQL Server Types", Oct. 17, 2008, 2 pages, accessed online at <http://www.pchenry.com/Home/tabid/36/EntryId/42/Mapping-between-NET-CLR-types-and-SQL-Server-types.aspx> on Sep. 5, 2012.*

Reinwald et al., "Storing and Using Objects in a Relational Database", IBM Systems Journal, vol. 35, No. 2, 1996, pp. 172-191.*

Ambler, Scott W., "Mapping Objects to Relational Databases", Jul 2000, 13 pages, accessed online at <https://www.ibm.com/developerworks/library/ws-mapping-to-rdb/> on Aug. 30, 2012.*

"Java Native Access (JNA)—Copyright: 1995—2007", Retrieved at <<https://jna.dev.java.net/>>, Aug. 17, 2009, p. 11.

Abrams,et al., "Programming in .NET: The Type System", Retrieved at <<http://www.informit.com/articles/article.aspx?p=30608>>, Jan. 17, 2003, p. 9.

Mascarenhas, et al., "Running Lua Scripts on the CLR through Bytecode Translation", Retrieved at <<http://www.jucs.org/jucs_11_7/running_lua_scripts_on/jucs_11_7_1275_1290_mascarenhas.pdf>>,Journal of Universal Computer Science, vol. 11, No. 7 (2005), Jul. 28, 2005, pp. 1275-1290.

Blakeley, et al., "Use SQL CLR 2.0-Advancing CLR Integration in SQL Server 2008—Published date: 2007", Retrieved at <<http://www.code-magazine.com/Article.aspx?quickid=0712132>>, CoDe (2007—vol. 4—Issue 3—Data Programability, Aug. 17, 2009, p. 3.

Banerjee, et al., "All Your Data: The Oracle Extensibility Architecture", Retrieved at <<http://www.grandpoohbah.net/Sandeepan/ComponentDatabases.pdf>>, pp. 32.

Hilwa, Al, "Oracle Database and Microsoft Windows and. NET Interoperability: Packing Much More than Meets the Eye", Retrieved at <<http://www.oracle.com/technologies/microsoft/docs/idc-interop.pdf>>, Apr. 2009, p. 14.

"CLR User-Defined Types" Retrieved at <<http://keithelder.net/blog/archive/2007/10/29/Creating-Custom-SQL-CLR-UserDefined-Types.aspx>>, Oct. 22, 2009, p. 17.

"Wikipedia—SQL Server" Retrieved at <<http://en.wikipedia.org/wiki/Microsoft_SQL_Server>>, Oct. 9, 2009, p. 15.

* cited by examiner

EXTENDING TYPES HOSTED IN DATABASE TO OTHER PLATFORMS

BACKGROUND

A database usually comes with several built-in data types. For example, a database may include integer, string, currency, date, and other types. In addition to the built-in data types, a column of a database may store custom or user-defined types. For example, the column may store a user-defined data type as a blob of binary data. The user-defined types in this binary data may not be understood when accessing the database with an application that did not create the binary data.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to extending types hosted in a database to other platforms. In aspects, a database may store objects according to a one type system while an application accessing the database may store objects according to another type system. To allow the application to understand the types, a mapping mechanism may be employed that maps from the types of type system of the database to types of a type system of the application. The mapping mechanism may utilize metadata associated with the data in mapping between types. In conjunction with mapping a source type to a target type, a target object may be instantiated and populated with properties of a source object of the source type.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment." Other definitions, explicit and implicit, may be included below.

Exemplary Operating Environment

Figure 1:
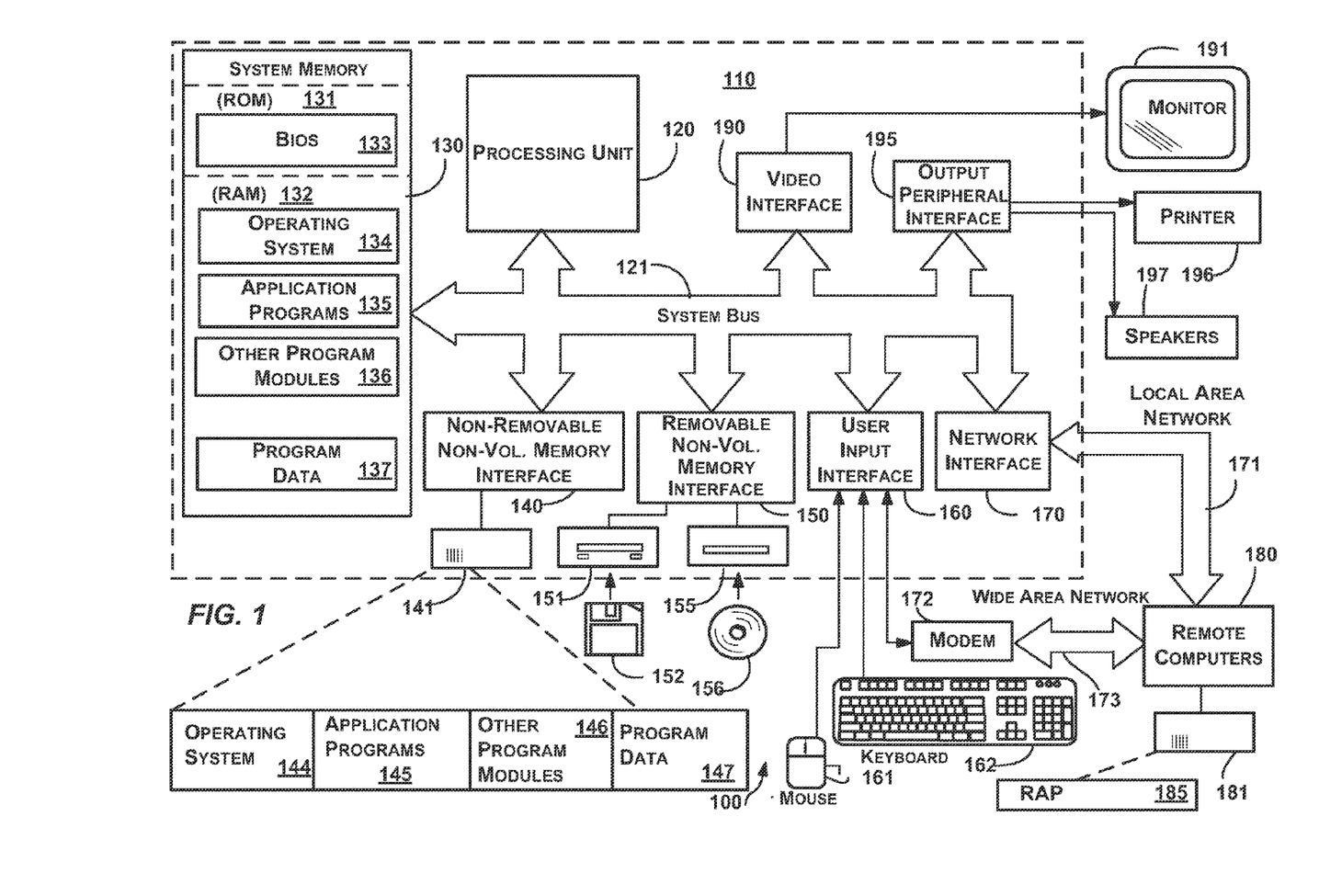
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Type Mapping

As mentioned previously, user-defined types in a database may not be understood when accessing the user-defined types with a driver developed for another object system. For example, when Microsoft .Net user-defined data types are stored in a Microsoft SQL Server, these user-defined data types may not be understood (other than as bits) when accessing the data types using a Java® Database Connectivity (JDBC) driver.

A database may have standard types that are built-in to the database such as integer, character, string, currency, date, other types, and the like. Such built-in types are understood by the DBMS of the database and may be readily manipulated by the DBMS.

Other types, such as user-defined types, may take advantage of a type extensibility mechanism of the database. A user-defined type may include 1) zero or more standard types of the database, 2) zero or more types that are not standard types of the database, and 3) zero or more other user-defined types.

For example, a user may define a point type that has X and Y coordinates where X and Y are integers within certain ranges. Even though a database may include a built-in integer type, it may not include a built-in integer type that is restricted to the ranges above for X and Y. Thus, the point type may be a user-defined type that is not composed of standard types of the database.

As another example, a user may define a Boolean type that is not included in the standard types of a database. As another example, a user may define an array type that includes elements that are not found in the standard types of the database. As another example, a user may define a car type that includes components and characteristics of a car where characteristics of the car are standard types and components of the car are other user-defined types.

As another example, a user may define an e-mail type that defines sequences of characters that make up valid e-mail addresses. As another example, a user may define an URL type that defines sequences of characters that make up valid locations on the Internet. In these two examples, the database may include a character type as a built-in type but may not include URL and e-mail address types that indicates valid sequences of the characters.

A user-defined type may include methods that validate data, methods that manipulate data, methods that return data, and other methods. User-defined types may not initially be built into the database and may be added by a system administrator, developer, end-user, or the like (herein sometimes referred to as a user) via a type extensibility mechanism. The type extensibility mechanism may extend the types understood by a DBMS of the database.

One exemplary type extensibility mechanism that may be employed includes defining a column of a table to correspond to a user-defined type and storing data regarding the user-defined type in the column. Type information associated user-defined type may also be stored in the database. In an object-oriented database, the type system of the database may be extended with a user-defined type by adding type information regarding the user-defined type to the type system of the database. The above type extensibility mechanisms are not intended to be all-inclusive or exhaustive. Indeed, other extensibility mechanisms may also be employed to extend the types of a database beyond the built-in types without departing from the spirit or scope of aspects of the subject matter described herein.

As used herein, extended types include user-defined types and any other types that take advantage of a type extensibility mechanism of a database.

Furthermore, the above examples of user-defined types are not intended to be all-inclusive or exhaustive of the possible user-defined types that may be stored in a database via a type extensibility mechanism. The very nature of having a type extensibility mechanism implies the possibility of creating types that are not originally built into the database. Mapping from these user-defined types to types in another type system is described in more detail herein.

Figure 2:
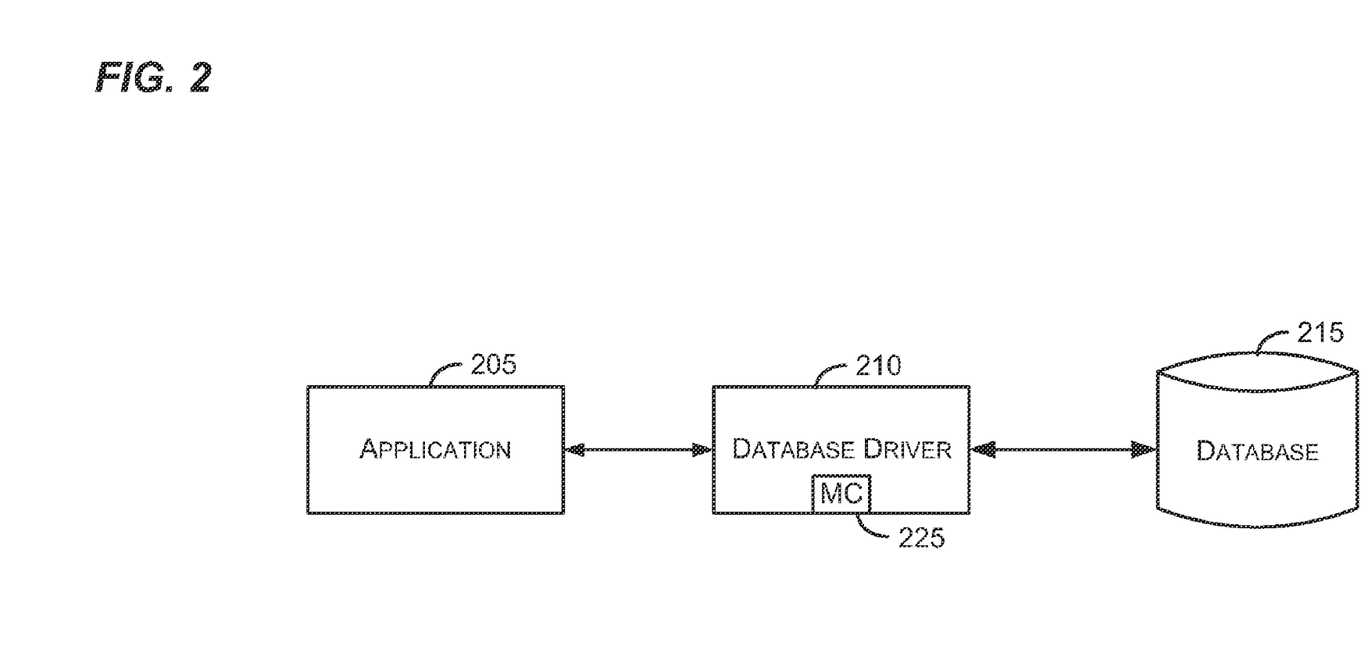
FIG. 2 is a block diagram representing an exemplary environment in which aspects of the subject matter described herein may be implemented.

FIG. 2 is a block diagram representing an exemplary environment in which aspects of the subject matter described herein may be implemented. The environment includes an application 205, a database driver 210, a database 215, and may include other entities (not shown). The database driver 210 may include mapping components 225 that map between types hosted in the database 215 and types understood by the application 205.

The various entities (e.g., the application 205, the database driver 210, and the database 215) may be located relatively close to each other or may be distributed across the world. For example, the application 205 and the database driver 210 may be located on the same machine, while the database 215 may be located on a different machine. In another example, the application 205 may be located on a first machine, while the database driver 210 may be located on an application server that provides application services. In yet another example, the three entities may be located on the same machine. The examples above are not intended to be all-inclusive or exhaustive. Indeed, based on the teachings herein, those skilled in the art may recognize other configuration that fall within the spirit and scope of aspects of the subject matter described herein.

Where a line connects one entity to another, it is to be understood that the two entities may be connected (e.g., logically, physically, virtual, or otherwise) via function/method calls or any type of network including a direct connection, a local network, a non-local network, the Internet, some combination of the above, and the like.

The application 205 comprises any software that seeks access to the database. Such software may execute in user mode, kernel mode, or some combination thereof. In some embodiments, such software may be distributed across two or more machines. Access as used herein may include reading data, writing data, deleting data, updating data, a combination including two or more of the above, and the like.

The database driver 210 may comprise a software component that provides a set of application program interfaces (APIs) to the application 205. The APIs allow the application 205 to request data from the database 215 and to read the data once it is received. In one embodiment, the APIs may conform to the Java® Database Connectivity (JDBC) standard. In another embodiment, the APIs may conform to the Open Database Connectivity (ODBC) standard. In yet other embodiments, the APIs may conform to another standard or may provide a propriety interface.

The database 215 comprises a data source that is capable of storing data in a structure format. The term data is to be read broadly to include anything that may be represented by one or more computer storage elements. Logically, data may be represented as a series of 1's and 0's in volatile or nonvolatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include program code, program state, program data, other data, and the like.

The database 215 may comprise a relational database, object-oriented database, hierarchical database, network database, other type of database, some combination or extension of the above, and the like. Data stored in a database may be organized in tables, records, objects, other data structures, and the like. The data stored in a database may be stored in dedicated database files, dedicated hard drive partitions, HTML files, XML files, spreadsheets, flat files, document files, configuration files, other files, and the like. A database may reference a set of data that is read-only to the database or may have the ability to read and write to the set of data.

Data in a database may be accessed via a database management system (DBMS). A DBMS may comprise one or more programs that control organization, storage, management, and retrieval of data of a database. A DBMS may receive requests to access data in a database and may perform the operations needed to provide this access.

In describing aspects of the subject matter described herein, for simplicity, terminology associated with relational databases is sometimes used herein. Although relational database terminology is sometimes used herein, the teachings herein may also be applied to other types of databases including those that have been mentioned previously.

The mapping components 225 of the database driver 210 map data types hosted by the database 215 into data types understood by the application 205. As used herein, the term component is to be read to include all or a portion of a device, a collection of one or more software modules or portions thereof, some combination of one or more software modules or portions thereof and one or more devices or portions thereof, and the like.

Data (including metadata) transferred between the database 215 and the application database driver 210 may be serialized. Serialization refers to placing the data in a format suitable for transferring the data via a network. Serialization may include encoding properties and metadata of an object in a series of bits.

In one embodiment, the database 215 may have a predefined way in which it serializes data including custom or user-defined objects. A driver receiving a serialized data is responsible for de-serializing the data.

In another embodiment, there may be a mechanism for registering serialization and de-serialization code. In this embodiment, the serialization code may determine how to encode properties and metadata of objects into bits suitable for transferring via a network. Likewise, the de-serialization code may determine how to decode properties and metadata of objects from their serialized form.

When the database driver 210 receives data corresponding to a user-defined or other type from the database 215, in conjunction with de-serializing the serialized stream received, the database driver 210 may use metadata associated with the data to map the type from the database 215 to a type understood by the application 205.

For example, metadata received from the database 215 for a type may indicate a name of a namespace. For illustrative purposes, for example, the metadata may include:

Microsoft.SQLServer.Types.SQLGeometry

In one embodiment, the namespace of a target type system may be constructed to be identical to or a superset of the type system of types stored in the database 215. In this embodiment, the mapping components 225 may locate a type name of the target type system using a one-to-one correspondence from the metadata returned from the database 215.

In another embodiment, just the last part of the metadata above may be used to map from the source type system to the target type system. For example, referring to the type name mentioned above, SQLGeometry may be used to map the type of the database 215 to a type of the target type system.

In the embodiments above, both the metadata and the data associated with a type may be stored in a column of a database. When obtaining data in the column, the driver 210 may receive the data and extract the metadata therefrom. Using the metadata, the mapping components 225 may map from the type indicated by the metadata to the target type system.

In addition to the metadata stored in the column, the database 215 may also include other metadata that pertains to a type. For example, the database 215 may store a type name for a column. The mapping components 225 may use the type name to map to a type of the target type system.

As another example, the database 215 may include other metadata about the column. Such other metadata may include, for example, whether fields in the column are nullable, a name of the column, a format of the column, other data about the column, and the like. The mapping components 225 may use this other metadata to map to a type of the target type system.

In one embodiment, a document may specify a specific mapping between extended types of the database 215 and types of the target type system. For example, a document may provide a mapping table that indicates mappings between extended types of the database and types included in a target type system. This document may, for example, be indicated by the application 205 when establishing a connection to the database 215.

In one embodiment, the mapping components 225 may use a combination of two or more of the above to map to a type of the target type system. For example, a combination of metadata included in a field of the column as well as other metadata that is indicated about the column may be used to map to a type of the target type system.

After a requested type in the database 215 has been mapped to a target type in the target type system, an object according to the target type may be instantiated and filled in with data received from the database 215. Filling in the properties of an object is sometimes referred to herein as populating the object. In one embodiment, a constructor of the object may be called to populate the object. In executing, the constructor may request data from a de-serializer and may use the data received from the de-serializer to fill in properties of the object.

As used herein, the term constructor is sometimes used in reference to populating an object. This term is meant to include any code (whether a part of the object or not) that may be called to populate the object and is not intended to be (but in one embodiment may be) limited only to code that is executed upon instantiation of an object.

The application 205, the database driver 210, and the database 215 may be hosted on one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as one of the above comprises the computer 110 of FIG. 1.

Although the environment described above includes various entities and related infrastructure, it will be recognized that more, fewer, or a different combination of these entities and others may be employed without departing from the spirit or scope of aspects of the subject matter described herein.

Furthermore, the entities and communication networks included in the environment may be configured in a variety of ways as will be understood by those skilled in the art without departing from the spirit or scope of aspects of the subject matter described herein.

Figure 3:
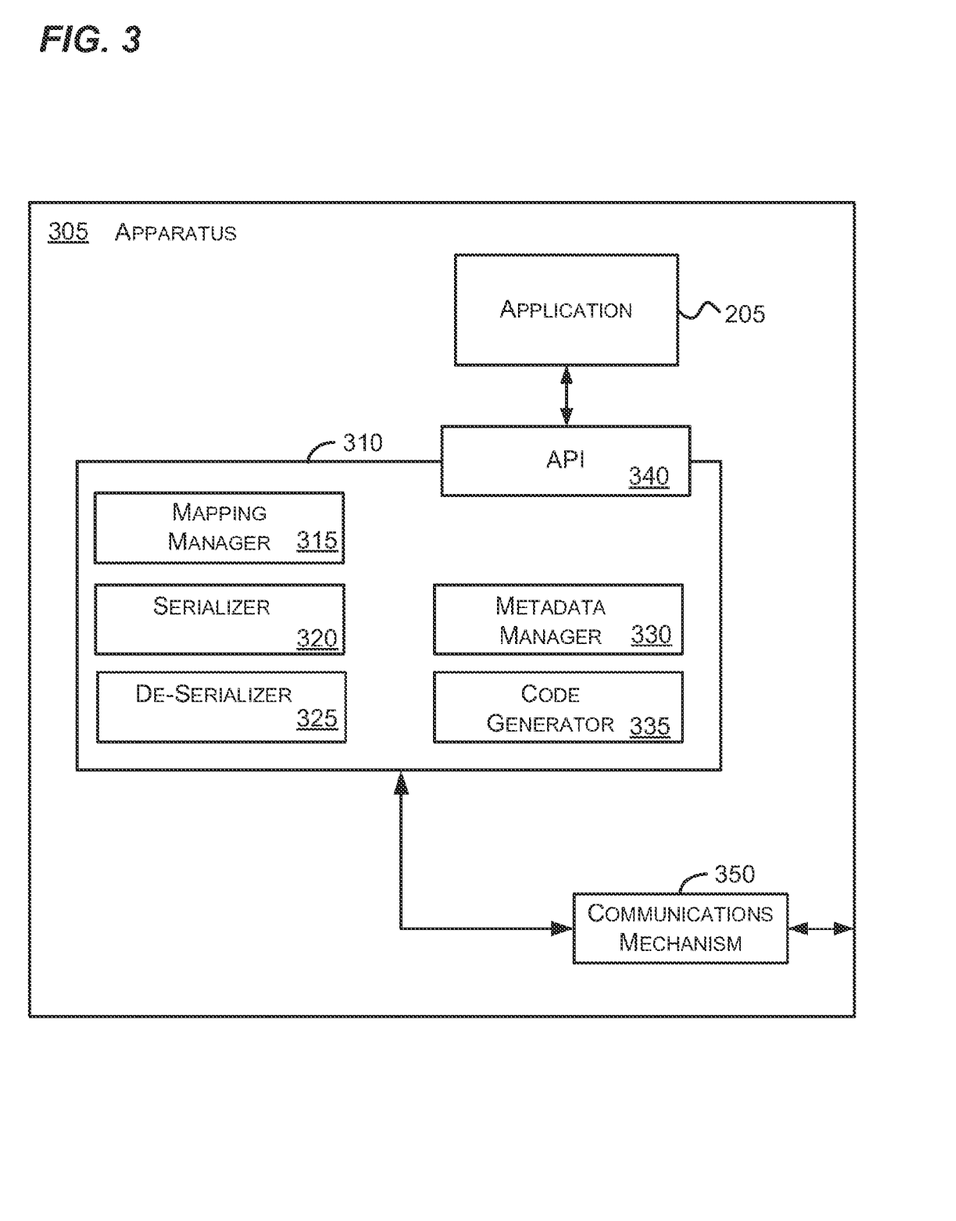
FIG. 3 is a block diagram that represents an apparatus configured in accordance with aspects of the subject matter described herein.

FIG. 3 is a block diagram that represents an apparatus configured in accordance with aspects of the subject matter described herein. The components illustrated in FIG. 3 are exemplary and are not meant to be all-inclusive of components that may be needed or included. In other embodiments, the components and/or functions described in conjunction with FIG. 3 may be included in other components (shown or not shown) or placed in subcomponents without departing from the spirit or scope of aspects of the subject matter described herein. In some embodiments, the components and/or functions described in conjunction with FIG. 3 may be distributed across multiple devices.

Turning to FIG. 3, the apparatus 305 may include mapping components 310, a communications mechanism 350, and other components (not shown). The mapping components 310 correspond to the mapping components 225 of FIG. 2. The apparatus 305 may be implemented on or as a computer (e.g., as the computer 110 of FIG. 1).

The mapping components 310 may include a mapping manager 315, a serializer 320, a de-serializer 325, a metadata manager 330, a code generator 335, an application programming interface (API) 340, and other components (not shown). In one embodiment, the mapping components 310 may operate as a database driver. In another embodiment, the mapping components 310 may operate as a database driver and may also include or reference other code for populating properties of objects from the driver and sending properties of objects to the driver for serialization.

The communications mechanism 350 allows the apparatus 305 to communicate with other entities. For example, the communications mechanism 350 may allow the apparatus 305 to communicate with the database 215 of FIG. 2. When the database 215 is also hosted on the apparatus 305, the mapping components 310 may use function/method calls to communicate with the database 215. When the database 215 is hosted on the apparatus 305, the communications mechanism 350 may be omitted or used to communicate with entities not hosted on the apparatus 305. The communications mechanism 350 may be a network interface or adapter 170, modem 172, or any other mechanism for establishing communications as described in conjunction with FIG. 1.

The mapping manager 315 is operable to map between types. When given a source type (e.g., a type of an object of the database or a type of an object of the application), the mapping manager is operable to determine a target type (e.g., a type of an object of the application or a type of an object of the database) of a target type system that corresponds to the source type. For example, if the source type corresponds to a user-defined type, the mapping manager 315 may determine a corresponding target type of a Java® application. The mapping manager 315 may map between types using both type metadata as well as database metadata as has been described previously.

The serializer 320 is operable to generate an outgoing stream to send to a database. The outgoing stream may include values and metadata of an object to send to the database. A stream is a sequence of data elements. A stream may comprise a series of bits, bytes, or other data. The serializer 320 may operate under the instructions of code of an object. The code may invoke the serializer 320 to serialize the data. In one embodiment, the serializer 320 may provide serialization for primitive types only. In another embodiment, the serializer 320 may provide serialization for primitive and other types.

The de-serializer 325 is operable to receive an incoming stream from a database and to generate incoming data therefrom. The incoming stream includes objects and metadata associated with the objects. The metadata included in the incoming stream indicates types of a source type system for the objects.

To populate a target object, the de-serializer 325 may be called (e.g., by a constructor) to provide primitive types (e.g., numbers, characters, strings, dates, and the like) from the serialized stream. In response, the de-serializer 325 may extract and provide corresponding data (e.g., numbers, characters, strings, dates, and the like) from the serialized stream for use in a target type system. The corresponding data provided by the de-serializer 325 may be used (e.g., by a constructor) to populate properties of objects of the types in the target type system.

The metadata manager 330 is operable to identify the metadata from the incoming data generated by the de-serializer 325. In one embodiment, the metadata manager 330 may be part of the de-serializer 325.

The mapping manager 315 is operable to determine, via the metadata, a target type corresponding to the source type. The target type is a type used by the target type system. For example, referring to FIG. 2, a target type may include a type used by the application 205. When the target type system is the database 215, a target type may include a user-defined or other type included in a column of the database 215.

The mapping manager 315 may determine target types via metadata by any of the methods previously indicated. For example, the mapping manager may be operable to locate the target type in a target namespace that is identical to a source namespace that includes the source type. As another example, the mapping manager may be operable to obtain a name (having multiple parts) of the source type, to obtain a last part of the name, and to map the last part of the name to a target name in the target type system. Other methods of determining target types may also be used.

The code generator 335 may be operable to generate code in the target system that, when executed, populates an object from an incoming stream. In one embodiment, a driver may instantiate an object (e.g., of a user-defined type) that includes the code. Upon execution, the code may request data from the de-serializer that operates on the incoming stream from the database and populate the object using the data. The code generated may be of a type customarily used in the target system.

The API 340 may be used to communicate with the mapping components 310. The API 340 may receive requests to access data and may service these requests by calling appropriate components of the mapping components and returning responses therefrom. The requests received by the API 340 may come from a process that is located on the apparatus 305 or a process that is located on another apparatus. For example, the API 340 may receive requests from the application 205. The application 205 may be located on the apparatus 305 or may be located on another apparatus.

The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. In one embodiment, an entity comprises a process as defined above. In another embodiment, an entity comprises any one or more objects that is/are capable of performing actions associated with or using or one or more processes.

Figure 4:
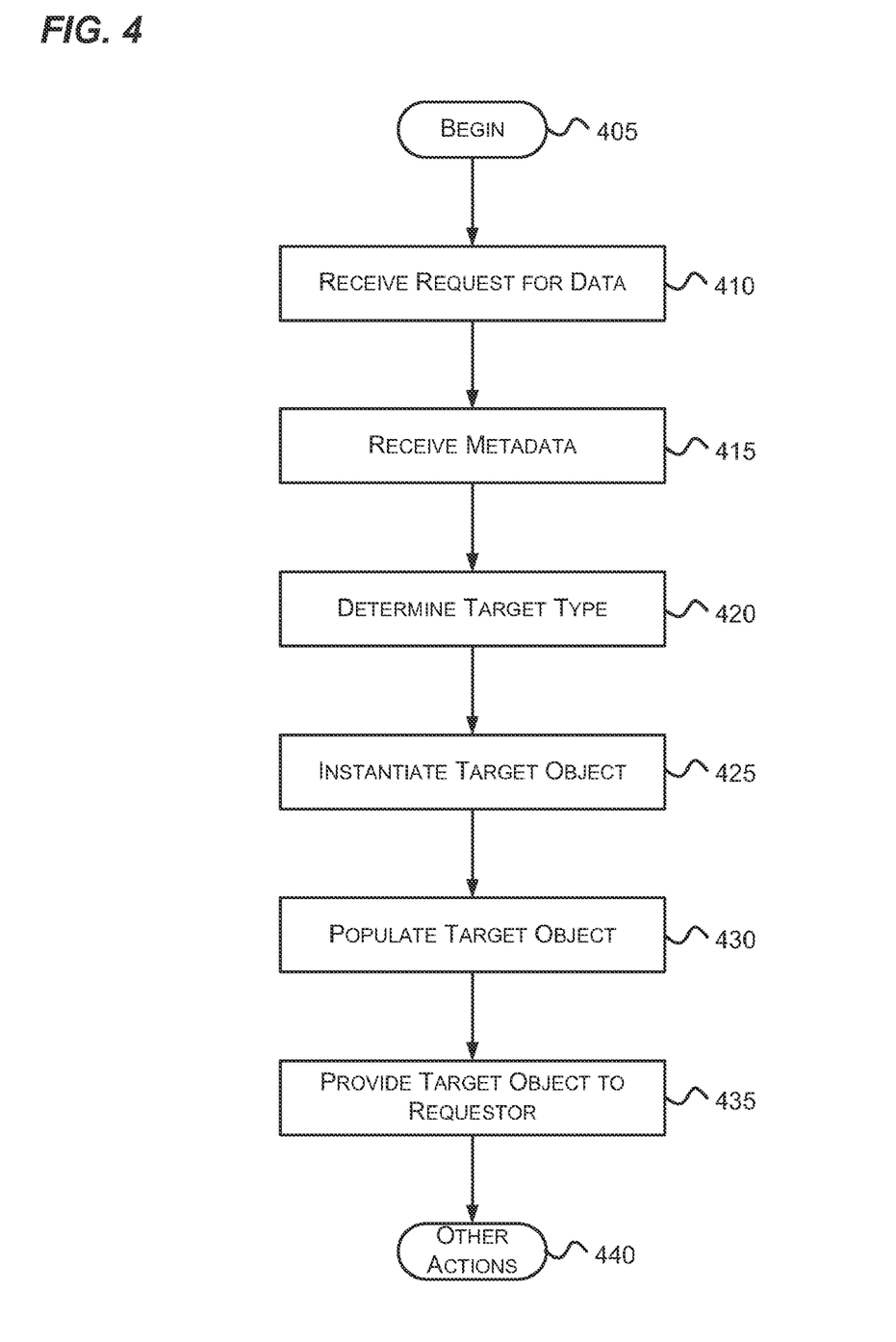
FIG. 4 is a flow diagram that generally represents actions that may occur in conjunction with obtaining data from a database in accordance with aspects of the subject matter described herein.
Figure 5:
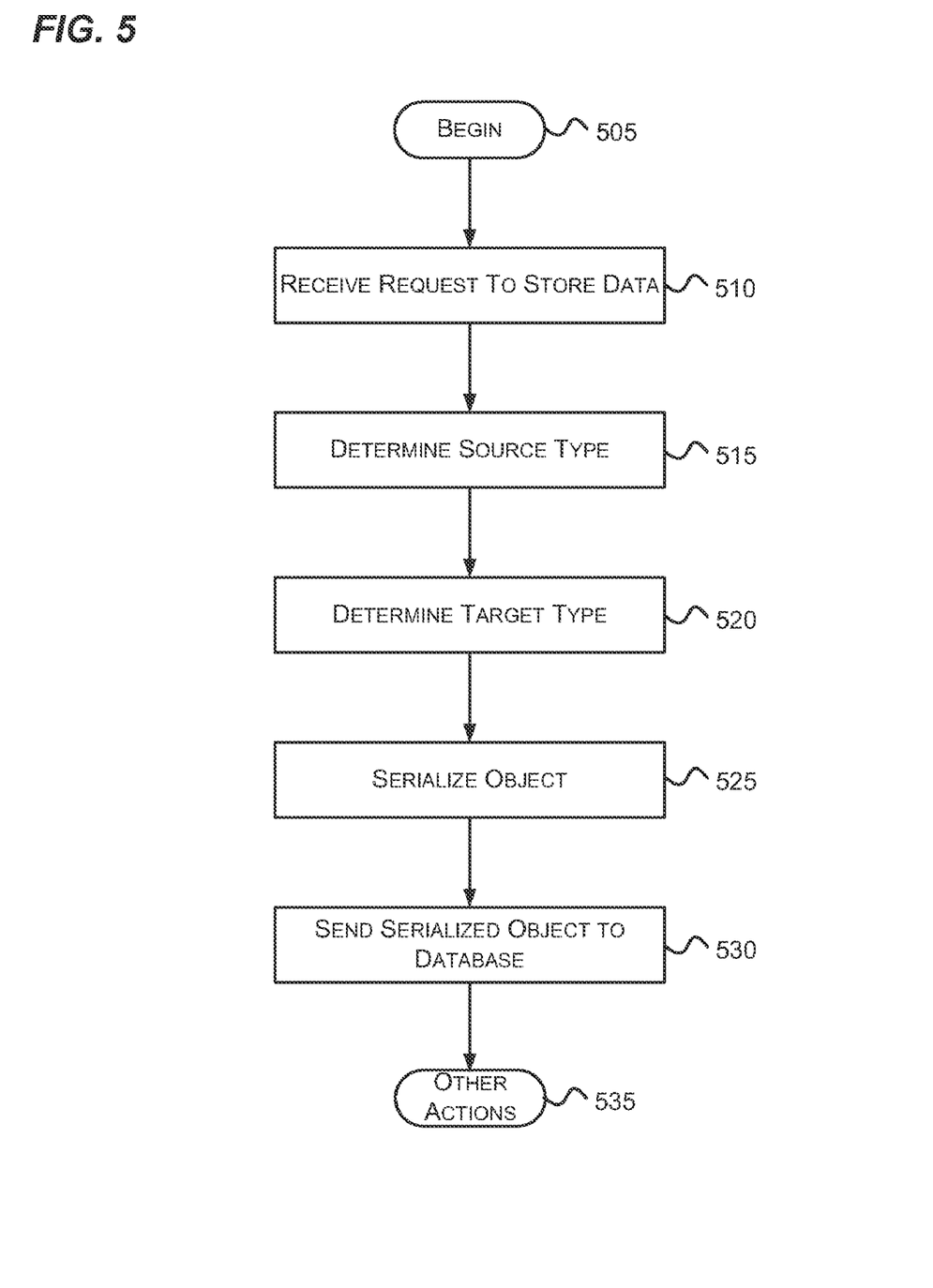
FIG. 5 is a flow diagram that generally represents actions that may occur in conjunction with sending data to a database in accordance with aspects of the subject matter described herein.

FIGS. 4-5 are flow diagrams that generally represent actions that may occur in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 4 is a flow diagram that generally represents actions that may occur in conjunction with obtaining data from a database in accordance with aspects of the subject matter described herein. At block 405, the actions begin. For example, referring to FIG. 2, the application 205 may seek to obtain data from the database 215.

At block 410, a request for data from the database is received. For example, referring to FIG. 2, the database driver 210 may receive a request for data from the application 205. The request may indicate that the application 205 seeks to obtain data from the database 215.

At block 415, metadata is received. For example, referring to FIG. 2, the database driver 210 may access the database 215 to obtain data corresponding to the data requested by the application 205. The data received from the database may include metadata and data. The metadata indicates a source type of the data. The source type indicates how the data is represented in the database. The metadata may regard a type that is not included in native types of the database.

Receiving the metadata may include receiving an indication of a source name that has a plurality of parts (e.g., such as Microsoft.SQLServer.Types.SQLGeometry). This source name may be included in a source namespace.

As mentioned previously, the database 215 may serialize objects according to one representation (e.g., .Net) while the application 205 may include objects according to another representation (e.g., Java®). More generally, the database 215 may have metadata associated with a platform having instructions represented according a source language (e.g., C#, C++, C, Basic, an intermediate such as bytecode, some other language, or the like) while the application may be associated with a platform having instructions represented according to a target language (e.g., Java® or some other language). The metadata associated with the source platform and/or the database metadata may be received when the metadata is received at block 415.

At block 420, the target type for providing the data to the application may be determined. For example, referring to FIG. 3, the mapping manager 315 may determine a target type. Determining the target type may be based on the metadata as previously described.

For example, a target namespace (e.g., for the application) that is identical to or a superset of the source namespace (e.g., the one represented in the database) may be created. In this example, determining a target type for providing the data to the application may comprise using a target name in the target namespace where the target name is identical to the source name of the source namespace.

As another example, determining a target type for providing the data to the application may include mapping a last part of the source name to a target name of the target namespace.

As another example, determining a target type for providing the data to the application may include using the metadata to locate an association in the document. For example, as mentioned previously, a document may include mappings (e.g., associations) between source types and targets types. Each association may simply indicate a source type and the target type.

As yet another example, code may be generated for a target platform upon which the application executes. The code, when executed, may define the target type and populate the object using the data.

The above examples are not intended to be all-inclusive or exhaustive. Based on the teachings herein, those skilled in the art may recognize many other ways for determining a target type based on metadata that may be employed without departing from the spirit or scope of aspects of the subject matter described herein.

At block 425, the target object is instantiated. For example, referring to FIG. 2, the database driver 210 may allocate space for and initialize an object. Instantiating a target object may include traditional instantiation of an object-oriented, allocating memory for data of an object, resetting (e.g., zeroing out or otherwise resetting properties) an already-existing object, and the like. In conjunction with instantiating an object, a class may be determined that correspond to the target type. Instantiating the target object may involve instantiating the object in accordance with the class. This may involve creating and initializing the object according to a class definition.

At block 430, the target object is populated. Populating the target object refers to filling in the properties of the target object using the data received from the source object. For example, referring to FIG. 2, the database driver 210 may be used (e.g., by a constructor of a target object) to fill in properties of the object using data received from the database 215. Code in the target system (e.g., a constructor of a target object) may obtain data from the database driver 210 and may use this data to fill in properties of the target object.

At block 435, the target object is provided to the requestor. For example, referring to FIG. 2, the database driver 210 may provide an object to the application 205. Providing as referred to in this sense may involve sending the object to the application 205, allocating memory, placing the object in the allocated memory, and returning a pointer to the memory to the application 205, filling in memory provided by the application 205 with the object, indicating a location of the object, and the like.

Some other actions that may occur at various times include receiving a serialized stream that includes the data, determining an order and type of properties included in the serialized stream based on the metadata, and de-serializing the stream to obtain properties of the object.

At block 440, other actions, if any, may be performed.

FIG. 5 is a flow diagram that generally represents actions that may occur in conjunction with sending data to a database in accordance with aspects of the subject matter described herein. At block 505, the actions begin. For example, referring to FIG. 2, the application 205 may seek to store data in the database 215.

At block 510, a request to store data is received. For example, referring to FIG. 2, the database driver 210 may receive a request to store data in the database 215 from the application 205.

At block 515, the source type of the object is determined. The source type is included in a type system of the application. For example, referring to FIG. 2, the database driver 210 may determine a source type of the object received from the application 205.

At block 520, a target type of the object may be determined. The target type may be included in a type system of the database. For example, referring to FIG. 3, the mapping manager 315 may determine a target type to use for storing the object in the database.

At block 525, the object may be serialized according to the target type. Serializing the object for the target type may include placing data derived from properties of the object in an order in which the data is to be sent to the database. For example, referring to FIG. 3, the serializer 320 may be used to serialize properties of the object into a stream to send to a database.

At block 530, the serialized object is sent to the database. For example, referring to FIG. 2, the database driver 210 may send the serialized object to the database 215.

At block 535, other actions, if any, may be performed.

As can be seen from the foregoing detailed description, aspects have been described related to extending types hosted in a database to other platforms. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   receiving, from an application, a request for data from a database;
   receiving metadata regarding a source type of the data comprising receiving an indication of a source name that has a plurality of parts, the source name included in a source namespace, the data represented in the database according to the source type, the source type being an extended type of the database, the metadata comprising at least metadata associated with a source platform and database metadata;
   based on the metadata, creating a target namespace that is identical to or a superset of the source namespace, determining a target type corresponding to the source type for providing the data to the application comprising mapping to a target type in a target namespace, the target type having a target name in the target namespace that is identical to the source name in the source namespace, the target type being a type of an object of the application depending on a target platform upon which the application executes;
   instantiating an object of the target type; and
   populating the object using the data.

2. The method of claim 1, wherein determining a target type for providing the data to the application comprises mapping a last part of a source name to a target name of the target namespace.

3. The method of claim 1, wherein receiving metadata regarding a source type of the data further comprises receiving a type name from the database and wherein determining a target type for providing the data to the application comprises looking up the target type in a table using the type name.

4. The method of claim 1, further comprising receiving a document that indicates associations between types of the database and types of the application, the document used to map between the types of the database and the types of the application.

5. The method of claim 4, wherein determining a target type for providing the data to the application further comprises using the metadata to locate an association in the document, the association indicating the source type and the target type.

6. The method of claim 1, wherein receiving metadata regarding a source type of the data further comprises receiving metadata associated with a platform having instructions represented according to a source language and wherein determining a target type for providing the data to the application comprises determining a target type for a platform having instructions represented according to a target language.

7. The method of claim 1, further comprising determining a class corresponding to the target type and wherein instantiating an object of the target type comprises instantiating the object in accordance with the class.

8. The method of claim 1, further comprising receiving a serialized stream that includes the data, determining, by the object, an order and type of properties included in the serialized stream based on the metadata, and de-serializing the serialized stream to obtain properties of the object.

9. The method of claim 1, wherein receiving metadata regarding a source type of the data comprises receiving metadata regarding a type that is not included in native types of the database.

10. In a computing environment, an apparatus, comprising:
    one or more memories;
    a processing unit operatively coupled to the one or more memories;
    an interface configured to receive a request to access data from a database, the data including an object of a source type, the source type being an extended type of a source type system of the database;
    a de-serializer configured to receive an incoming stream from the database and to generate incoming data therefrom, the incoming stream including the object and metadata associated with the object, the metadata indicating the source type, the metadata comprising at least metadata associated with a source platform, a source name that has a plurality of parts, the source name included in a source namespace and database metadata;
    a metadata manager configured to identify the metadata associated with the object from the incoming data generated by the de-serializer; and
    a mapping manager configured to determine, via the metadata, a target type corresponding to the source type, the target type being part of a target type system, the target type being represented differently for different target type systems, the mapping manager further creates a target namespace that is identical to or a superset of the source namespace, and determining a target type comprises mapping to a target type in the target namespace, the target type having a target name in the target namespace that is identical to the source name in the source namespace.

11. The apparatus of claim 10, further comprising a serializer configured to generate an outgoing stream to send to the database, the outgoing stream encoding properties and metadata of an object to send to the database.

12. The apparatus of claim 10, wherein the mapping manager is configured to determine a target type corresponding to the source type by being configured to locate the target type in the target namespace that is identical to the source namespace that includes the source type.

13. The apparatus of claim 10, wherein the mapping manager is configured to determine a target type corresponding to the source type by being configured to obtain a name of the source type, the name having a plurality of parts, to obtain a last part of the name, and to map the last part of the name to a target name in the target type system.

14. The apparatus of claim 10, further comprising a code generator configured to generate code that, when executed, performs actions, comprising:
 requesting the incoming data from the de-serializer; and
 populating an object of the target type using the incoming data.

15. A computer storage device having computer-executable instructions, which when executed perform actions, comprising:
 receiving, from an application, a request to store an object in a database;
 determining a source type of the object, the source type included in a type system of the application;
 receiving an indication of a source name that has a plurality of parts, the source name included in a source namespace;
 determining, via type metadata associated with the object and database metadata, a target type of the object, the target type included in a type system of the database, the target type being an extended type of the type system of the database, the target type being represented differently for different target type systems;
 creating a target namespace that is identical to or a superset of the source namespace, and wherein determining a target type for providing the data to the database comprises mapping to the target type in a target namespace, the target type having a target name in the target namespace that is identical to the source name in the source namespace;
 serializing the object into a serialized stream according to the target type, the serialized stream including at least encoded properties and type metadata associated with the object; and
 sending the serialized object to the database.

16. The computer storage device of claim 15, wherein receiving, from an application, a request to store an object in a database comprises receiving the request at a database driver.

17. The computer storage device of claim 15, wherein serializing the object according to the target type comprises placing data derived from properties of the object in an order in which the data is to be sent to the database.

* * * * *